(12) United States Patent
Enomoto

(10) Patent No.: US 7,090,071 B2
(45) Date of Patent: Aug. 15, 2006

(54) CONVEYOR SYSTEM

(75) Inventor: Masahiro Enomoto, Shiga (JP)

(73) Assignee: Daifuku Co., Ltd., (JP)

( * ) Notice: Subject to any disclaimer, the term of this patent is extended or adjusted under 35 U.S.C. 154(b) by 37 days.

(21) Appl. No.: 11/038,766

(22) Filed: Jan. 19, 2005

(65) Prior Publication Data

US 2005/0178642 A1 Aug. 18, 2005

(30) Foreign Application Priority Data

Feb. 12, 2004 (JP) ............................. 2004-034327
Feb. 12, 2004 (JP) ............................. 2004-034328

(51) Int. Cl.
*B65G 15/60* (2006.01)

(52) U.S. Cl. .................................................. 198/841
(58) Field of Classification Search ................ 198/834, 198/837, 838, 812, 813, 841, 842

See application file for complete search history.

(56) References Cited

U.S. PATENT DOCUMENTS

| | | | | |
|---|---|---|---|---|
| 986,753 | A * | 3/1911 | Plummer | 198/500 |
| 3,592,334 | A * | 7/1971 | Fleischauer | 198/629 |
| 3,858,473 | A * | 1/1975 | Bystron | 83/401 |
| 4,084,687 | A * | 4/1978 | Lapeyre | 198/844.2 |
| 4,325,480 | A * | 4/1982 | Butt | 198/841 |
| 4,720,008 | A * | 1/1988 | Ufland | 198/841 |
| 4,898,272 | A * | 2/1990 | Swinderman et al. | 198/841 |
| 5,131,530 | A * | 7/1992 | Rappen | 198/841 |
| 5,190,145 | A * | 3/1993 | Ledginham et al. | 198/841 |
| 5,310,047 | A * | 5/1994 | Ledingham | 198/841 |
| 6,367,619 | B1 * | 4/2002 | Cemke et al. | 198/841 |
| 6,523,679 | B1 * | 2/2003 | Manchester | 198/841 |
| 6,640,966 | B1 * | 11/2003 | Reatti | 198/841 |

FOREIGN PATENT DOCUMENTS

| | | |
|---|---|---|
| JP | 09-052621 | 2/1997 |
| JP | 2001-301957 | 10/2001 |
| JP | 2003-128237 | 5/2003 |
| JP | 2004-043067 | 2/2004 |

* cited by examiner

*Primary Examiner*—Douglas Hess
(74) *Attorney, Agent, or Firm*—Kusner & Jaffe

(57) ABSTRACT

A conveyor system including a suppressing device which moves to a position below a driving sprocket to suppress hanging down of a chain moving in a direction opposite a conveying direction. The suppressing device includes: a pair of supporting plates respectively formed by a flat part and a curved part, and arranged to freely move vertically with a fixed point with a return-side guide as its supporting point; a pair of guiding rollers respectively provided at a diagonally lower position of the driving sprocket at a downstream end of the conveying direction to sandwich the curved part with a pair of right and left slat rollers turned downward from the sprocket; and a position adjusting member for suppressing the rotation of the guiding roller involved in the diagonally downward movement of the curved part which is caused by the slat roller, and adjusting the downward movement of the supporting plate.

8 Claims, 10 Drawing Sheets

US 7,090,071 B2

CONVEYOR SYSTEM

FIELD OF THE INVENTION

The present invention relates to a conveyor system used to convey articles.

BACKGROUND OF THE INVENTION

As a known conveyor system, for example, JP-A 09-52621 (1997) discloses a conveyor system which will now be described. In the following description, a direction in which the article is conveyed with the conveyor system is referred to as a conveying direction and a direction perpendicular to the conveying direction on a plane is referred to as a horizontal direction.

The conveyor system comprises a body frame which constitutes a frame of the conveyor system and is arranged in the conveying direction, a driven shaft which is rotatably arranged in the horizontal direction at an upstream end of the conveying direction of the body frame, a driving shaft which is rotatably arranged in the horizontal direction at a downstream end of the conveying direction of the body frame, and a driving electric motor gear which is coupled to the driving shaft.

The body frame is formed by upper frame bars and lower frame bars respectively arranged on both right and left sides in the conveying direction, an intermediate frame member for coupling the right and left upper frame bars and lower frame bars, and a leg body arranged downward continuously from the right and left lower frame bars.

A pair of right and left sprockets are respectively arranged on the right and left ends of the driven shaft and the driving shaft, and a chain is arranged between the left sprocket of the driven shaft and the left sprocket of the driving shaft, and between the right sprocket of the driven shaft and the right sprocket of the driving shaft.

Further, multiple slats (guide bars) are attached between the right and left chains, with the horizontal direction being defined as a longitudinal direction, and a shoe (movable body), guided by the slat to freely reciprocate in the horizontal direction, is externally fitted over the slat.

According to the above configuration, when the electrical motor is driven to rotationally drive the driving shaft, both chains move by means of each sprocket, thus conveying the article provided on the slat in the conveying direction.

A branch conveyor, slanted outwardly and downwardly with respect to the conveying direction, is coupled at an external position on both right and left sides of the body frame, and by traversing the shoe group from one side to the other side in the horizontal direction while moving in the conveying direction, the article is laterally pushed and transferred to the branch conveyor.

However, the configuration of the above mentioned known conveyor system has the following problems.

When starting up the conveyor system, the chain positioned below the sprocket arranged on the driving shaft, that is, the return side chain moving in the direction opposite the conveying direction of the article, stretches thus causing the chain to hang down below the sprocket.

Further, if a supporting plate supporting the return side chain is arranged below the sprocket arranged on the driving shaft, when the chain hangs down below the sprocket, it contacts the supporting plate thus generating a contacting noise, which contacting noise becomes louder as the body length of the body frame becomes greater (longer) and the conveying speed becomes faster.

SUMMARY OF THE INVENTION

The present invention addresses the above problems, and provides a conveyor system capable of preventing hanging, due to stretching, of a return side chain, and greatly reducing contacting noise generated between the return side chain and a supporting plate.

In order to achieve the above object, a conveyor system of the present invention comprises a body frame constituting a frame of a conveyor system and is arranged in a conveying direction of an article, a driven shaft which is rotatably arranged at an upstream end of the conveying direction of the body frame and is provided with a driven sprocket on both ends in a horizontal direction perpendicular to the conveying direction, and a rotatably driven driving shaft which is arranged rotatably at a downstream end of the conveying direction of the body frame and is provided with a driving sprocket arranged on both ends in the horizontal direction, wherein chains are arranged between the left driven sprocket and the left driving sprocket and between the right driven sprocket and the right driving sprocket, respectively, the article is supported on a plurality of slats arranged across the right and left chains, and the article is conveyed by the rotational drive of the driving sprocket. Herein, the conveyor system further comprises a pair of right and left slat rollers which are coupled to the chain at each right and left ends of each slat and support the slat, a pair of right and left advance side guides which are arranged along the conveying direction at the inner surface of the body frame and support and travel each of the right and left slat rollers in the conveying direction, a pair of right and left return side guides which are arranged below the advance side guide at the inner surface of the body frame and support and travel each of the right and left slat rollers in a direction opposite the conveying direction, and a suppressing device which moves downward below the driving sprocket and suppresses the hanging of the chain moving in the direction opposite the conveying direction.

According to this configuration, the hanging of the chain down below the driving sprocket can be suppressed, and the contacting noise generated between the chain and the supporting plate can be greatly reduced by this suppression of the hanging.

DETAILED DESCRIPTION OF PREFERRED EMBODIMENTS

Figure 1:
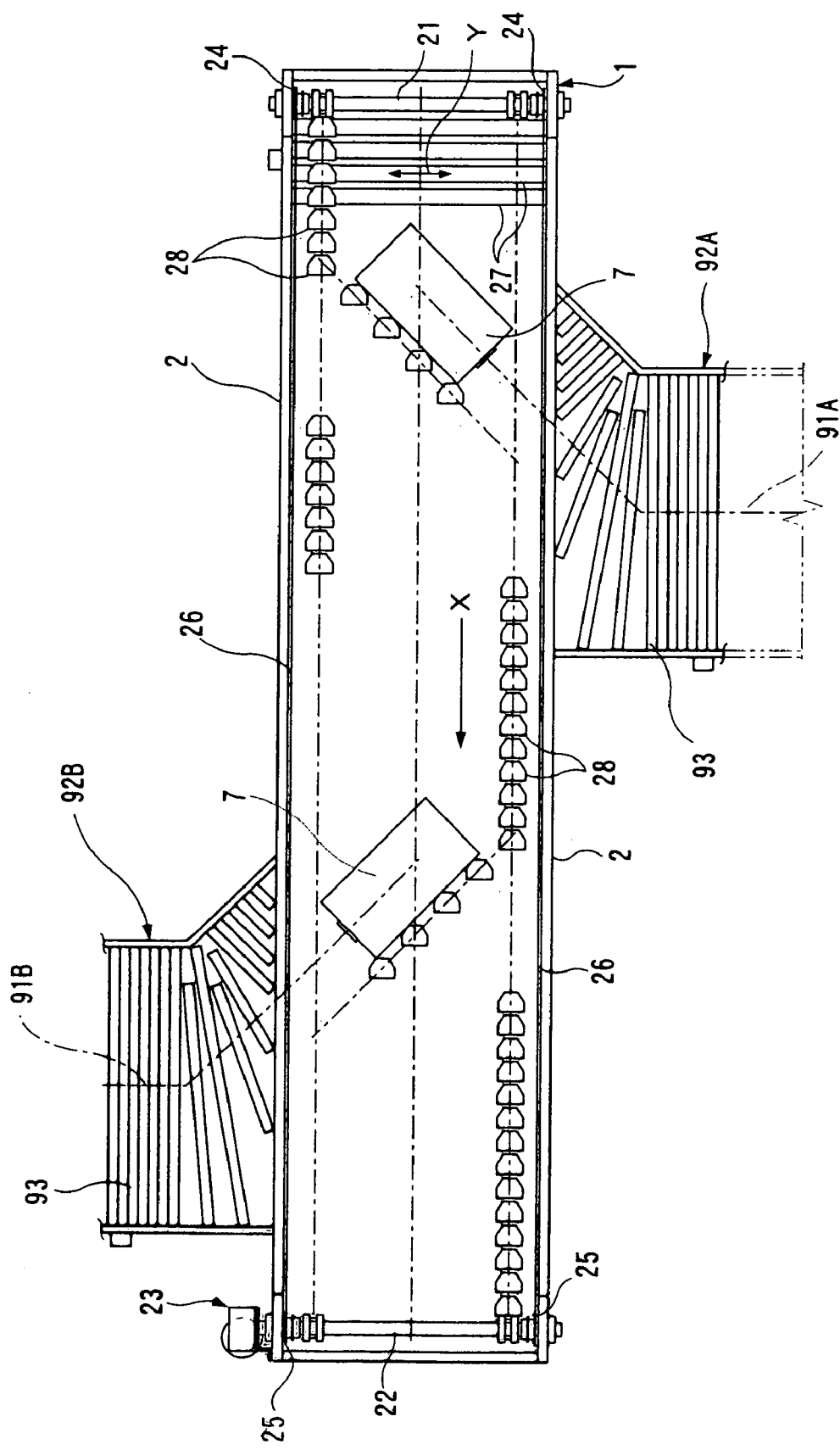
FIG. 1 is a plan view of a conveyor system according to a first embodiment of the present invention.
Figure 2:
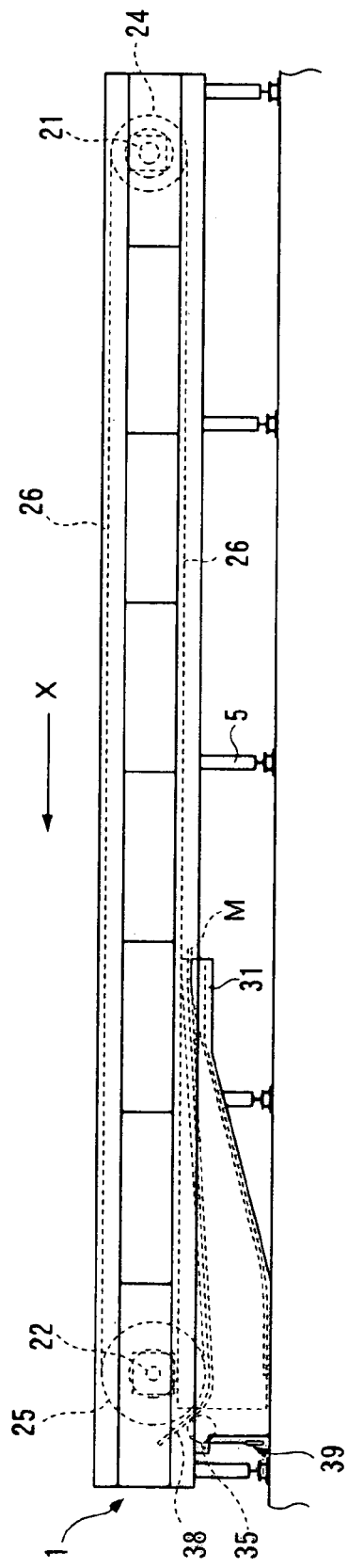
FIG. 2 is a side view of the conveyor system.

Embodiments of the present invention will now be described with reference to the drawings.

First Embodiment

A slat type conveyor (shoe slide type sorting device) will now be described as a conveyor system of the first embodiment of the present invention based on FIGS. 1 to 7. In the description, a direction for conveying the article by the slat type conveyor is referred to as a conveying direction X and a direction perpendicular to the conveying direction X on a plane is referred to as a horizontal direction Y.

As shown in FIGS. 1 to 3B, a body frame 1 of the slat type conveyor constitutes a frame of the conveyor system and is arranged, with the conveying direction X being defined as a long direction, and the horizontal direction Y as a short direction (arranged in the conveying direction X of the article). The body frame 1 is constituted by upper frame bars 2 and lower frame bars 3 each arranged as upper and lower pair on both sides of the horizontal direction Y, a longitudinal coupling member 4 for coupling upper and lower frame bars 2, 3, a lateral coupling member (not shown) for coupling both right and left upper frame bars 2 and lower frame bars 3, and a leg body 5 arranged downward continuously from both lower frame bars 3.

Figure 4:
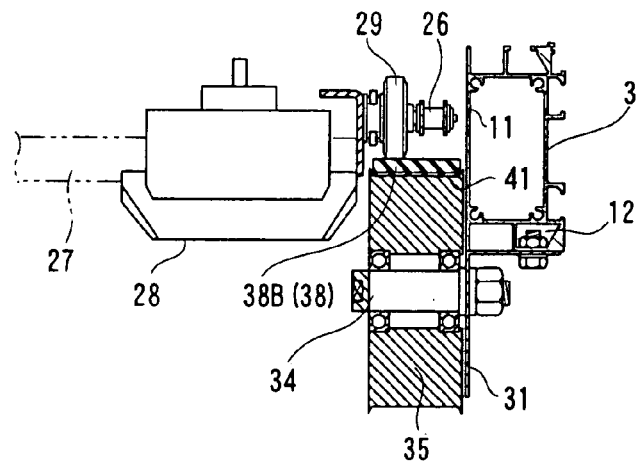
FIG. 4 is a cross sectional view taken along A—A line in FIG. 3B.

As shown in FIG. 4, the lower frame bar 3 is formed by a molded component of aluminum so as to have a rectangular cross section. Further, the lower frame bar 3 forms a standing part 11 in the vertical direction at an inward position, and an externally downward dovetail 12 is formed at an external lower end of the standing part 11. The leg part 5, using the externally downward dovetail 12, is coupled to the right and left lower frame bars 3 with a bolt nut.

Figure 3A:
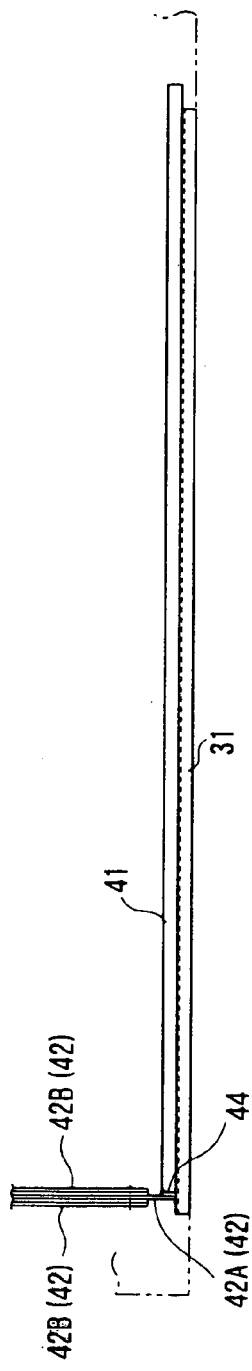
FIG. 3A is a plan view showing main parts at a downstream end of a conveying direction of the conveyor system.
Figure 3B:
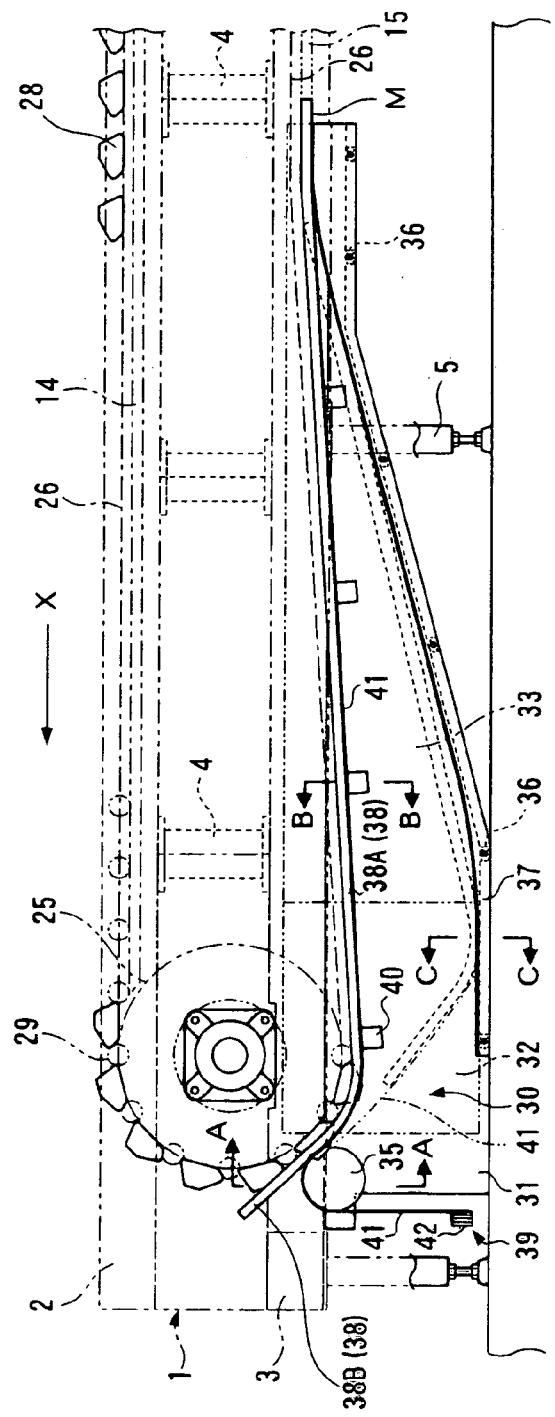
FIG. 3B is a side view showing main parts at a downstream end of the conveying direction of the conveyor system.

As shown in FIGS. 1, 3A and 3B, a driven shaft 21 is rotatably supported on both lower frame bars 3 and arranged in the horizontal direction Y at an upstream end of the conveying direction X of the body frame 1. A driving shaft 22 is rotatably supported on both lower frame bars 3 and arranged in the horizontal direction Y at a downstream end of the conveying direction X of the body frame 1. A driving electrical motor 23 is gear coupled to the driving shaft 22. Further, a pair of right and left driven sprockets (driven circular body) 24 are arranged on both right and left ends of the driven shaft 21, and a pair of right and left driving sprockets (driving circular body) 25 are arranged on both right and left ends of the driving shaft 22.

A chain (endless rotating body) 26 is arranged between the left driven sprocket 24 and the left driving sprocket 25, and between the right driven sprocket 24 and the right driving sprocket 25. A plurality of slats (guide bar, one example of article supporting body) 27 for supporting the article 7 is arranged across such pair of right and left chains 26, that is across the horizontal direction Y perpendicular to the traveling direction of both chains 26.

A shoe (movable body) 28 guided by the slat 27 and freely reciprocating in the horizontal direction Y is externally fit to each slat 27. Further, a slat roller (rotating body) 29 for supporting the slat 27 is coupled to the chain 26 and arranged on each right and left ends of the slat 27. The outer periphery of the slat roller 29 is covered with a band body made of urethane rubber. An advance side guide 14 is provided in the conveying direction X on the inner surface of each right and left upper frame bars 2 of the body frame 1 to support and travel each slat roller 29 in the conveying direction X. A pair of right and left return side guides are arranged below the advance side guide 14 on each inner surface of the lower frame bar 3 of the body frame 1 to support and travel each right and left slat rollers 29 in the direction opposite the conveying direction X.

As shown in FIGS. 3A to 6, a suppressing device 30 which is constituted by a guide bracket 31, a first side guide 32, a second side guide 33, a guiding roller 35, a supporting rail 37, a supporting plate 38, a position adjusting member 39, a coupling member 40 and the like, and moves downward below the driving sprocket 25 and suppress the hanging of the chain 26 moving in the direction opposite the conveying direction X, is arranged at the downstream side of the conveying direction X of the lower frame bar 3 and below the lower frame bar 3.

The guide sprocket 31 is arranged along the long direction from the lower position of the driving sprocket 25 at the lower side of the externally downward dovetail 12 of the lower frame bar 3, and is formed by a plate material of reverse L-shaped cross section.

The first side guide 32 is arranged in the longitudinal direction adjacent to the inside of the guide sprocket 31 and is made of a rectangular flat plate material.

The second side guide 33 is arranged in the longitudinal direction on the same plane and adjacent to the first side guide 32 at the upstream side of the conveying direction, and is arranged adjacent to the inside of the guide sprocket 31, and is made of a flat plate material in which one end has a width of the first side guide 32 and the other end has a narrower width compared to the above end.

The supporting plate 38 is made of urethane rubber and is formed from a flat part 38A of horizontal shape arranged along the long direction from the lower position of the driving sprocket 25, and a curved part 38B curved upward along the outer shape of the driving sprocket 25 from one end of the flat part 38A. The other end of the flat part 38A is fixed to a starting end of the return side guide 15 bearing on the lower frame bar 3, and the supporting part 38 is provided so as to be freely movable upwards and downwards with such fixed point M as a supporting point. The supporting plate 38 supports each of the right and left slat rollers 29 moving downward below the driving sprocket 25.

The guiding shaft 34 is supported at the downstream end in the conveying direction of the guide sprocket 31 and at the upper position of the guide sprocket 31. The guiding roller 35 is arranged at the diagonally lower position on the downstream side of the conveying direction of the driving sprocket 25 by the guiding shaft 34, and sandwiches the curved part 38B of each supporting plate 38 with the right and left slat rollers 29 moved downward from the driving sprocket 25.

The supporting rail 37 is formed by a member having a T-shaped cross section, and arranged interior to the guide bracket 31 by means of a plurality of rectangular plate collar (one example of coupling body) 36.

Figure 5:
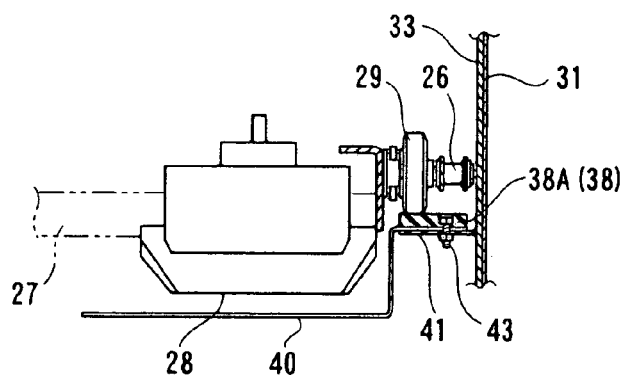
FIG. 5 is a cross sectional view taken along B—B line in FIG. 3B.

The coupling member 40 couples the pair of right and left supporting plates 38, and when coupling the right and left supporting plates 38, as shown in FIG. 5, coupling is performed with a bolt nut 43 with the end of the coupling member 40 positioned between the supporting plate 38 and the belt body 41.

Figure 6:
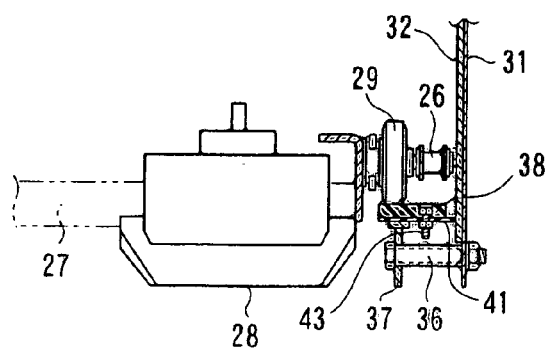
FIG. 6 is a cross sectional view taken along C—C line in FIG. 3B.

The position adjusting member 39 is formed by a pair of right and left belt bodies (band shaped member) 41 for supporting the supporting plate 38 from below, and one or more balance weight (one example of adjusting member) 42 coupled to the other end of the belt body 41. The belt body 41 has one end fixed to the fixed point M, and is arranged from the fixed point M to the lower position of the guiding roller 35 along the lower surface of the supporting plate 38 and the upper surface of the guiding roller 35. The belt body 41 is made of urethane rubber with polyester fabric as the core, and is designed to be thin and without much stretching and a long life span. Further, the position adjusting member 39 suppresses the rotation of the guiding roller 35 involved in the diagonally downward movement of the curved part 38B by the slat roller 29, and adjusts the movement of the supporting plate 38 in the downward direction. As shown in FIG. 6, the supporting plate 38 and the belt body 41 are coupled at a plurality of locations with the bolt nut 43.

Figure 7:
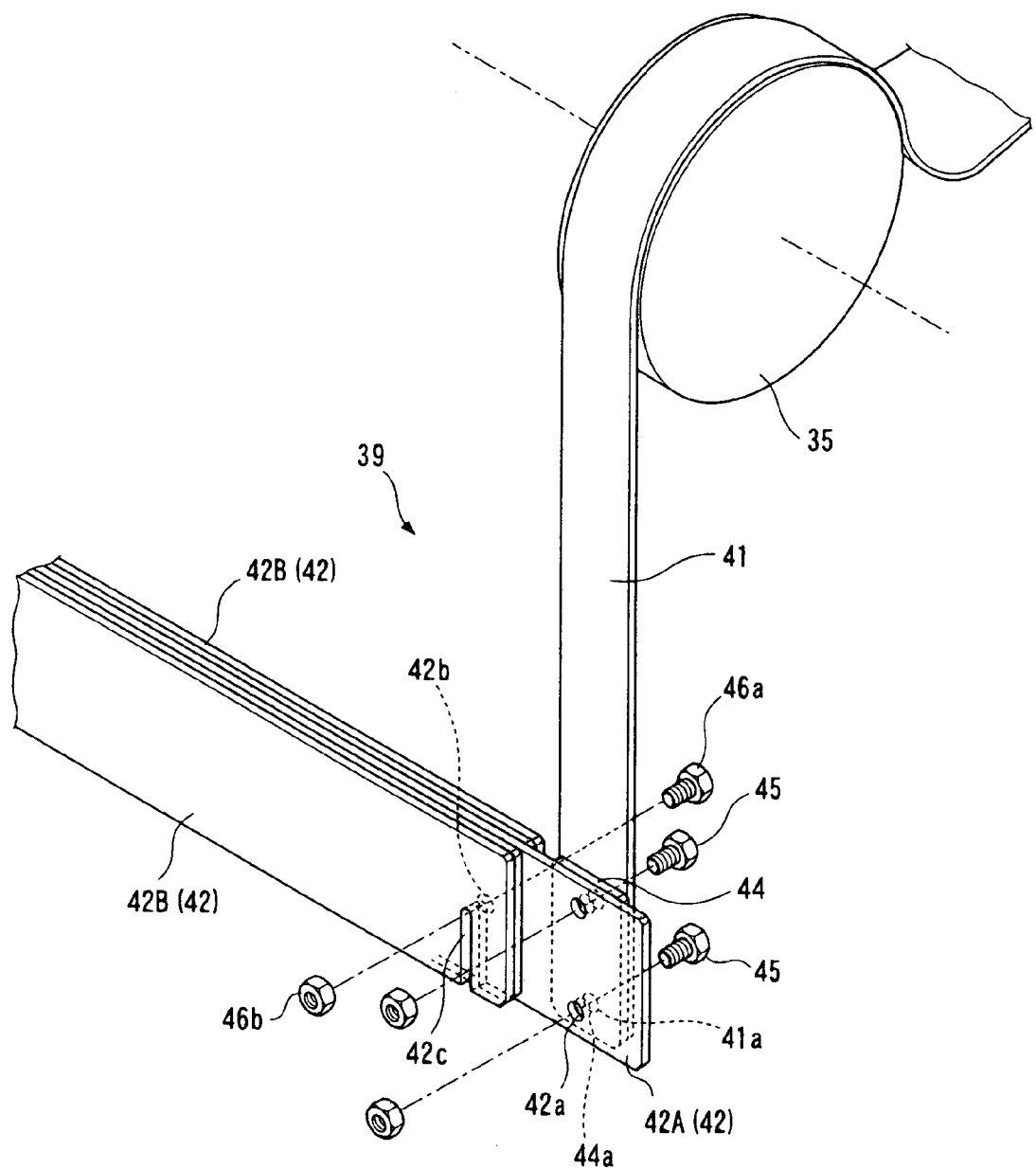
FIG. 7 is a perspective view of a position adjusting member in the conveyor system.
Figure 8:
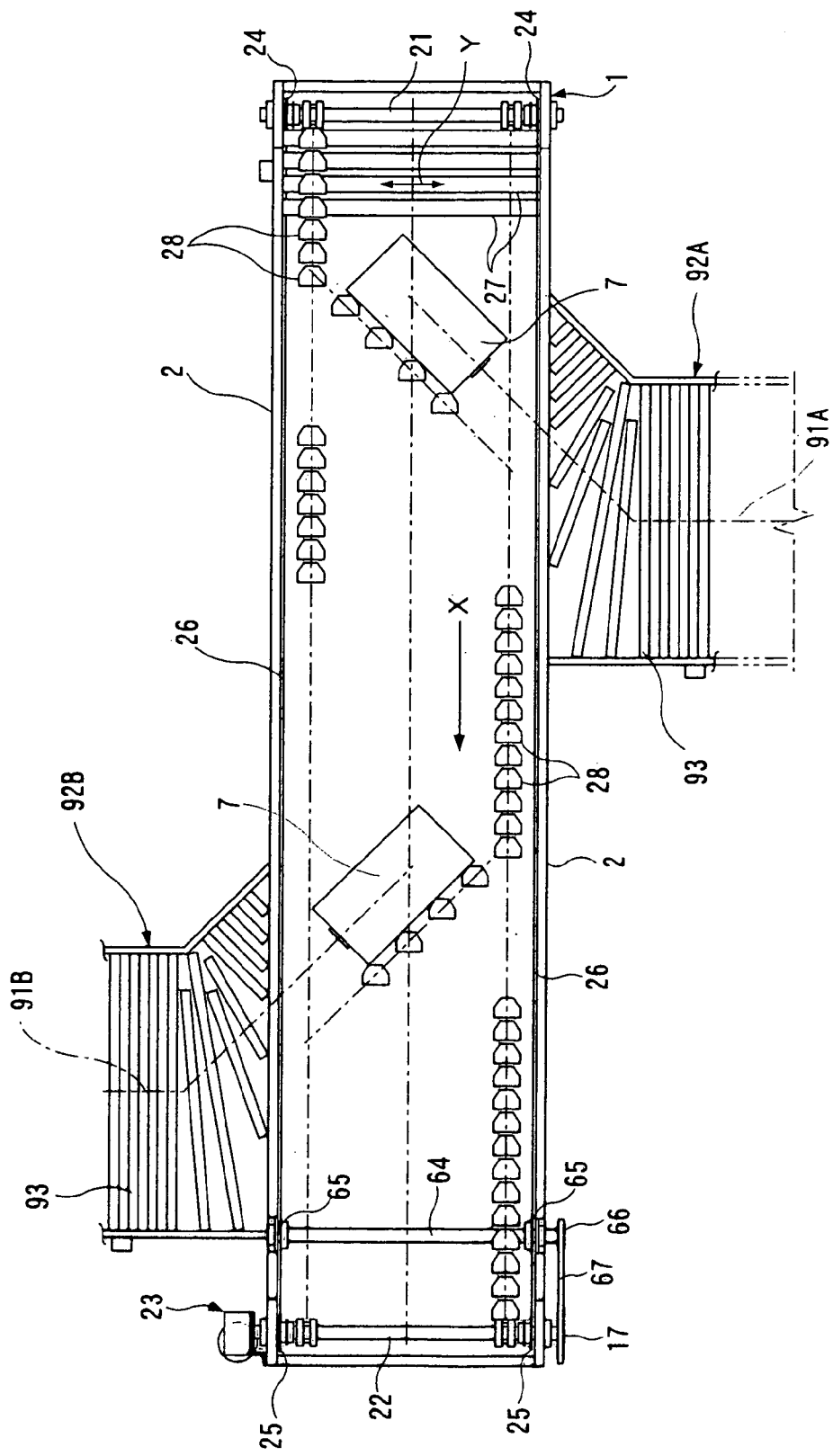
FIG. 8 is a plan view of a conveyor system according to a second embodiment of the present invention.
Figure 9:
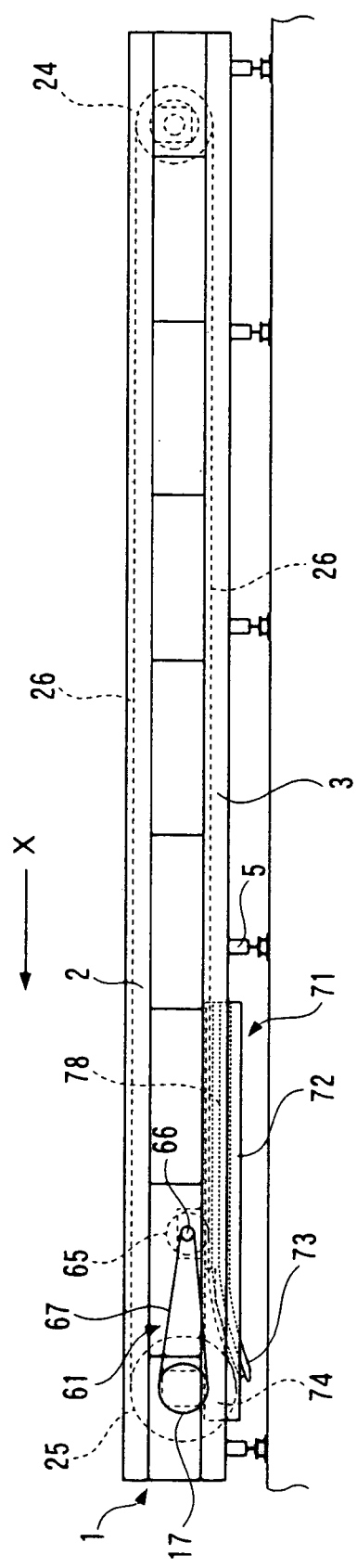
FIG. 9 is a side view of the conveyor system.

As shown in FIG. 7, two through-holes 41a are formed in the vertical direction at one end of the belt body 41. A plate body 44 to be attached to such end of the belt body 41 is provided, and two through-holes 44a are formed in the vertical direction on the plate body 44. Two through-holes 42a are formed in the vertical direction on both ends of the balance weight 42A, and one inserting hole 42b is formed in an inward position of the two through-holes 42a. A long hole 42c is formed on the balance weight 42B facing the inserting hole 42b of the balance weight 42A.

When coupling the balance weight 42 to the other end of the belt body 41, first, each of the two through-holes 41a of the belt body 41, the two through-holes 44a of the plate body 44 and the two through-holes 42a of the balance weight 42A are communicated, and each member is coupled with a bolt nut 45. The bolt 46a is screw fit to the inserting hole 42b of the balance weight 42A, the balance weight 42B is arranged so that the upper end of the long hole 42c of the balance weight 42B is supported by the bolt nut 46a, and the balance weight 42B is attached to the balance weight 42A with the bolt 46a and the nut 46b by adjusting the number of balance weight 42B, that is, by adjusting the load on the relevant end of the right and left belt bodies 41. By adjusting the load on the relevant end of the right and left belt bodies 41, a degree of change in the vertical direction of the supporting plate 38 is adjusted.

As shown in FIG. 1, branch conveyors 92A, 92B forming the branch paths 91A, 91B slanted outwardly and downwardly with respect to the conveying direction X are coupled on both outer sides of the frame body 1. The branch conveyors 92A, 92B include multiple rollers 93 rotatably driven by the driving device.

The conveying operation according to the above embodiment will now be described.

First, before carrying out the conveying task, five (a plurality of) balance weights 42 are provided on the end of the belt body 41 taking into consideration the length of the body frame 1 and the conveying speed of the article 7, and the degree of hanging is adjusted so that the supporting plate 38 does not hang greatly when, during the drive of the slat type conveyor, the return side chain 26 positioned below the driving sprocket 25 is stretched, and the supporting plate 38 for supporting the slat roller 29 coupled to the chain 26 is lowered by the weight of the slat 27 with the fixed point M as the supporting point.

Although five balance weights 42 are used in the present embodiment, the number of weight balance 42 must be appropriately changed since the amount of hanging of the return side chain 26 at the downstream end of the conveying direction differs by the length of the body frame 1 and the conveying speed of the article 7.

When conveying the article 7 by the above mentioned slat type conveyor, the electrical motor 23 is driven thus rotatably driving the driving shaft 22, the right and left chains 26 are rotated by means of the driven sprocket 24 and the driving sprocket 25, which in turn circulates and moves the slat 27 group while being supported and guided by the advance side guide 14 and the return side guide, and the article 7 provided on the slat 27 of the upstream end in the conveying direction is thereby conveyed in the conveying direction X. The shoe 28 integrally moving with the slat 27 group performs the allocating task of the article 7 by having a plurality of shoe simultaneously reciprocate in the long direction of the slat 27.

When driving the slat type conveyor performing the conveyance, the chain 26 on the return side positioned below the driving sprocket 25 is stretched, and the chain 26 is hanged by the weight of the slat 27. The right and left slat rollers 29 that are coupled to the chain 26 and land at the curved part 38B of the supporting plate 38 press the supporting plate 38 downward by the hanging of the chain 26, thus lowering the belt body 41 supporting the supporting plate 38 from below along with the supporting plate 38 with the fixed point M as the supporting point.

Since the belt body 41 attempts to move the belt body 41 and the supporting plate 38 upward with the weight (gravity) of the five (a plurality of) balance weights 42 coupled in advance to the other end of the belt body 41, the rotation of the guiding roller 35 involved in the movement of the curved part 38B in the diagonally downward direction by the slat roller 29 is suppressed, that is, the lowering of the supporting plate 38 is suppressed.

When the supporting plate 38 supporting the return side chain 26 lowers during the drive of the slat type conveyor, the lowering of the supporting plate 38 is suppressed by the belt body 41 and the balance weight 42, that is, the position adjusting member 39 and thus the hanging of the return side chain 26 is suppressed.

Further, since the supporting plate 38 is made of urethane rubber, when the right and left slat rollers 29 moving downward from the driving sprocket 25 land on the supporting plate 38, the impact of the slat roller 29 is alleviated.

The right and left supporting plates 38 are coupled with a plurality of coupling members 40 in a direction Y orthogonal to the conveying direction X at a predetermined interval in the long direction, and thus the vertical movement of the right and left supporting plates 38 is synchronized and the upper and lower position becomes symmetrically the same.

Here, as shown with a broken line in FIG. 3B, when the supporting plate 38 is excessively lowered, the supporting plate 38 and the belt body 41 contacts the upper part of the supporting rail 37, as shown in FIG. 6. Since the belt body 41 contacting the supporting rail 37 is made of urethane rubber, the impact on the supporting rail 37 is alleviated, and thus the contacting noise can be made small.

According to the first embodiment, when the chain 26 on the return side positioned below the driving sprocket 25 is stretched during the drive of the slat type conveyor and the supporting plate 38 lowers by the weight of the slat 27 with the fixed point M as the supporting point, the lowering of the supporting plate 38 is suppressed by the position adjusting member 39 thus suppressing the hanging of the chain 26 on the return side, and even if contacting the upper part of the receiving rail 37 by the hanging of the chain 26 on the return side, the belt body 41 and the receiving rail 37 are contacted and thus the contacting noise is made small.

According to the first embodiment, when the slat roller 29 in which the outer periphery thereof is made of urethane rubber lands on the supporting plate 38, the slat roller 29 is received by the supporting plate 38 made of urethane rubber, and thus the impact of the slat roller 29 is alleviated.

According to the first embodiment, by coupling the pair of right and left supporting plates 38 with the coupling member 40, the vertical movement of the right and left supporting plates 38 is synchronized, and the stable vertical position adjustment with respect to the right and left supporting plates 38 can be performed, and the supporting plate 38 can be supported evenly on the left and the right, thus preventing the slat 27 from slanting to the left or the right, and the load from being applied to only one of the chains 26.

According to the first embodiment, by providing a plurality of balance weights 42 to the relevant end of the belt body 41 taking into consideration the length of the body frame 1 and the conveying speed of the article 7, the degree of hanging of the supporting plate 38 can be adjusted for each conveyor system, and thus the return side chain 26 is prevented from hanging greatly.

In the first embodiment, one or more balance weight 42 is used as the adjustment member coupled to the other end of the belt body 41, but the adjusting member may be constituted by for example, a spring or an air cylinder in which one end is coupled to the end of the belt body 41, and the other end is coupled to the ground.

In the first embodiment, the supporting plate 38 is made of urethane rubber, but is not limited thereto, and may be made of a material that alleviates the impact of the slat roller 29, or a material that alleviates the impact of the slat roller 29 and absorbs the contacting noise of the slat roller 29.

Second Embodiment

A slat type conveyor (shoe slide sorting device) will now be described as a conveyor system of the second embodiment of the present invention based on FIGS. 8 to 13. The same components as in the first embodiment are denoted with the same reference characters and thus the description thereof will be omitted. In the following description, the direction for conveying the article by the slat type conveyor is referred to as the conveying direction X, and the direction perpendicular to the conveying direction X on a plane is referred to as a horizontal direction Y.

Figure 11:
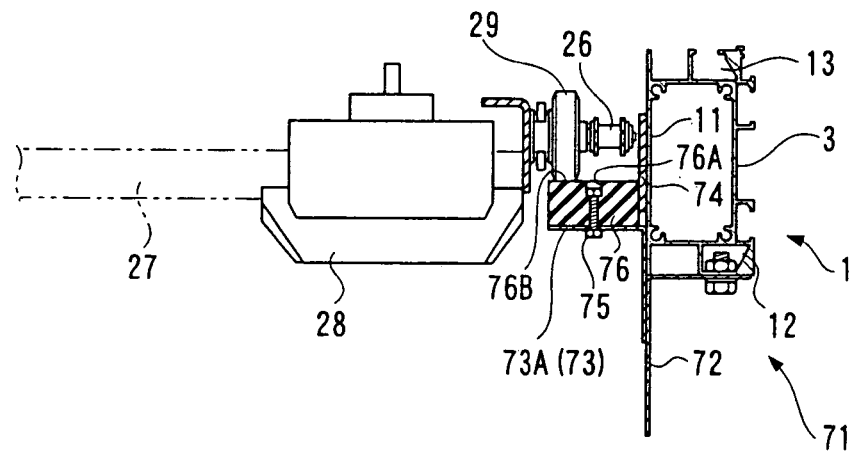
FIG. 11 is a cross sectional view taken along A—A line in FIG. 10B.
Figure 12:
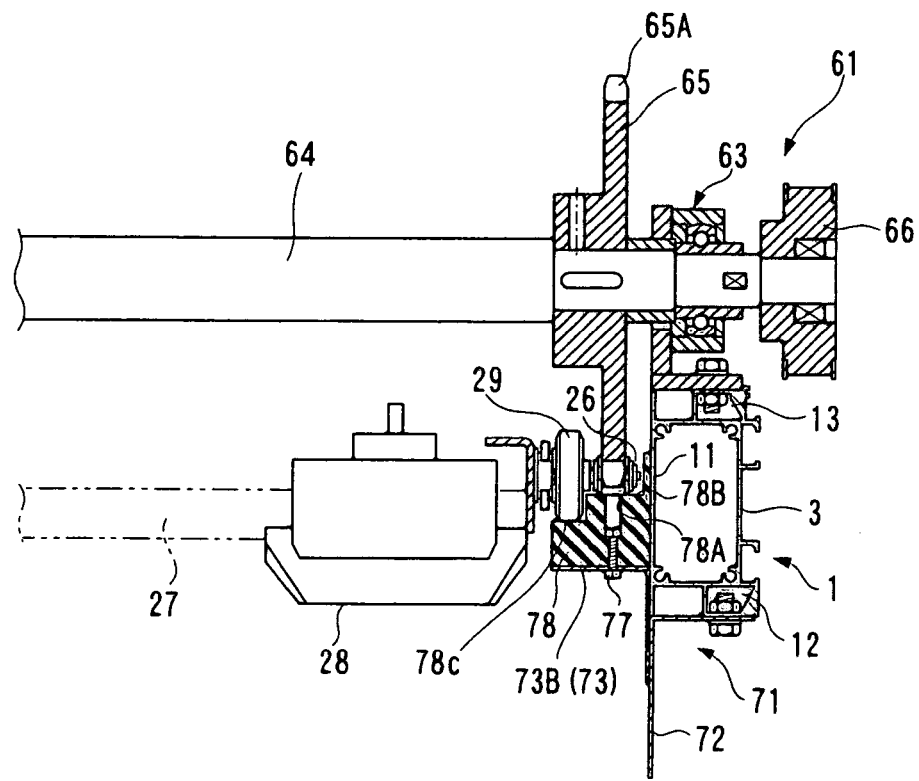
FIG. 12 is a cross sectional view taken along B—B line in FIG. 10B.
Figure 13:
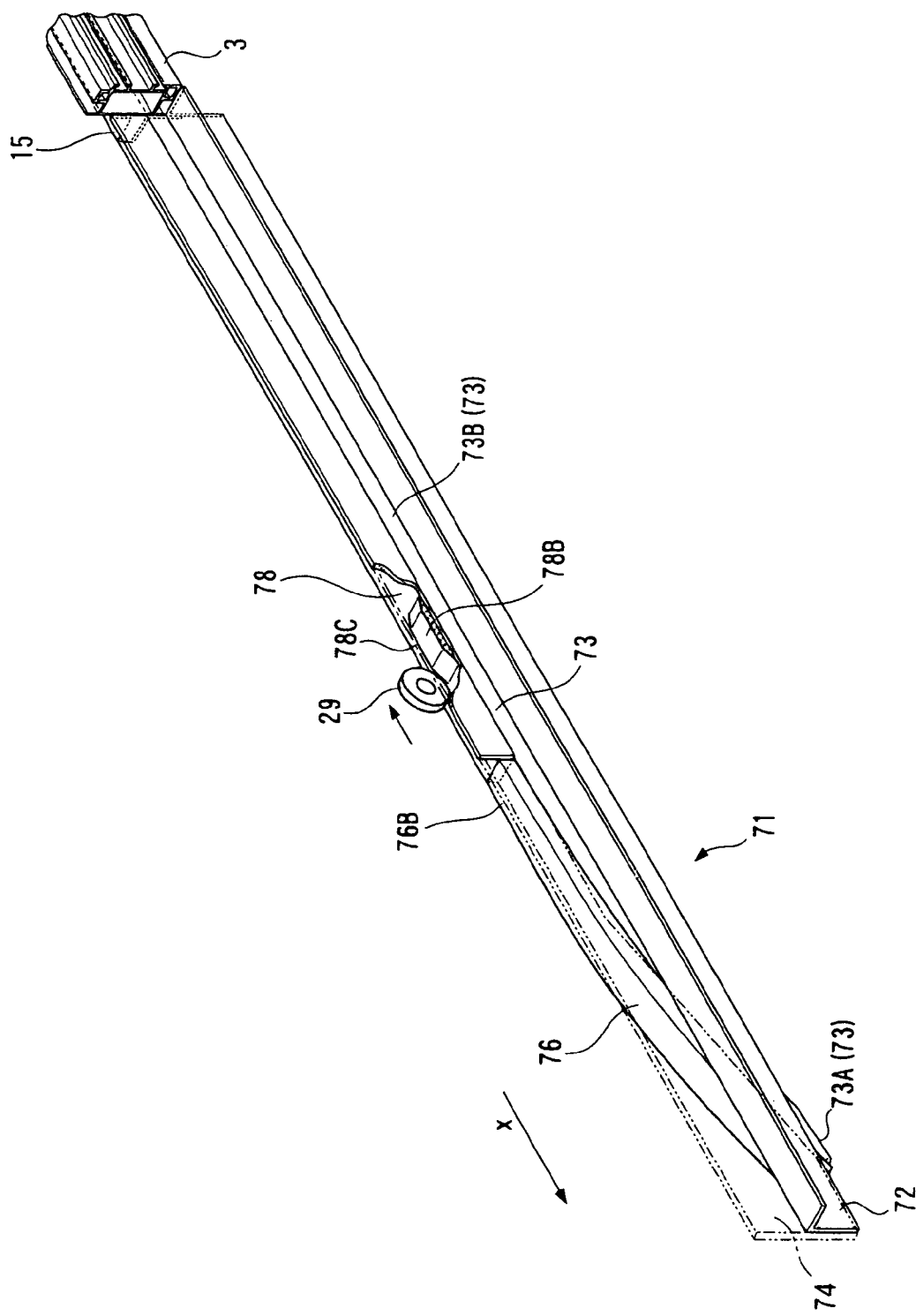
FIG. 13 is a perspective view of a guiding device in the conveyor system.

As shown in FIGS. 11 and 12, an externally upward dovetail 13 is formed at an externally upper end of the standing part 11.

As shown in FIGS. 8 to 10B, on the driving shaft 22, a stretching sprocket (driving outer sprocket) 17 having a smaller diameter than the driving sprocket 25 and rotated with the right and left driving sprockets 25 is arranged external to the driving sprocket 25 on the left side in the conveying direction X.

Figure 10A:
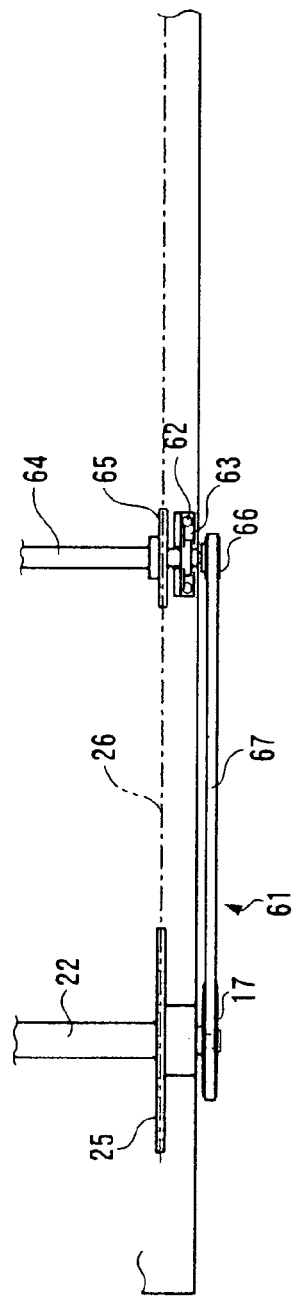
FIG. 10A is a plan view showing main parts at a downstream end of a conveying direction of the conveyor system.
Figure 10B:
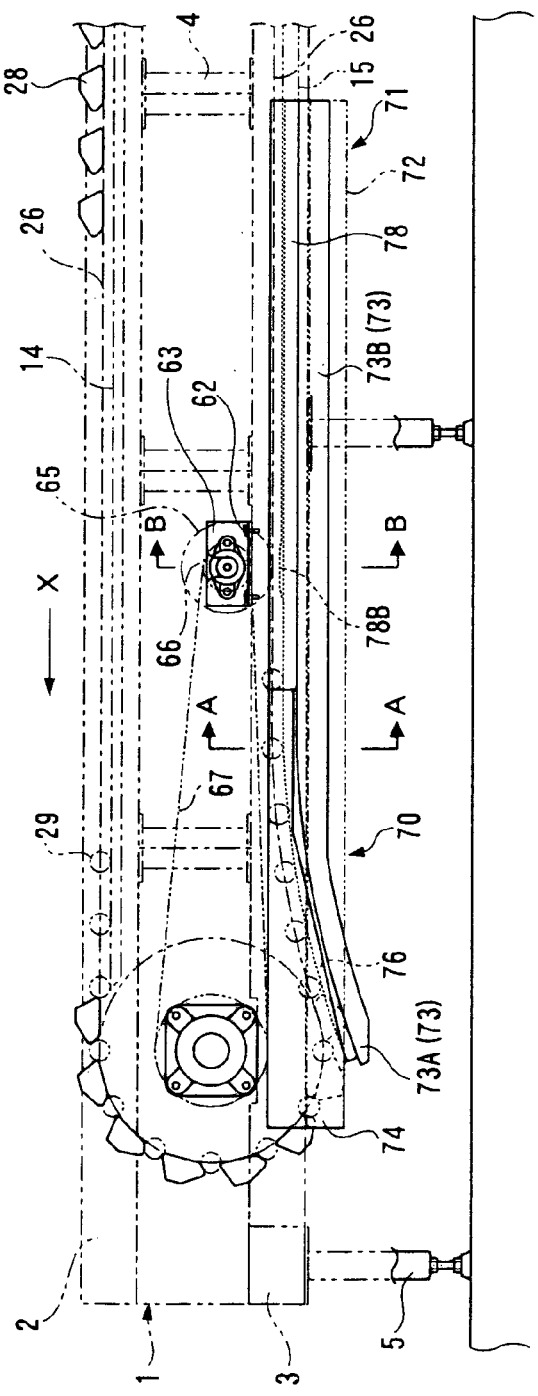
FIG. 10B is a side view showing main parts at a downstream end of the conveying direction of the conveyor system.

As shown in FIGS. 10A and 10B, a tension adjusting means 61 is provided on the upstream side of the conveying direction X with a predetermined distance from the driving sprocket 25. A suppressing device 70, coming around to below the driving sprocket 25, for suppressing the hanging of the chain 26 moving in the direction opposite the conveying direction X is constituted by the tension adjusting means 61, the stretching sprocket 17 and the guiding device 71, to be hereinafter described.

The tension adjusting means 61 is constituted by for example, a bearing part 63, an adjusting driven shaft 64, an adjusting interior sprocket (one example of adjusting circular body) 65, an adjusting exterior sprocket (one example of adjusting stretching device) 66, an endless timing belt (one example of an operating member) 67 and the like.

The bearing part 63, using the externally upward dovetail 13 of the lower frame bar 3, is coupled to the upper part of the right and left lower frame bars 3 by a coupling attachment 62, and the adjusting driven shaft 64 is arranged on the bearing part 63 in a freely rotating manner.

The adjusting interior sprocket 65 is provided on both ends of the adjusting driven shaft 64, and rotates the return side chain 27 moving in the direction opposite the conveying direction X.

The adjusting exterior sprocket 66 is formed with a smaller diameter than the adjusting interior sprocket 65, and is fixed to the adjusting driven shaft 64 at an outward position of the adjusting interior sprocket 65 on the left side. The adjusting exterior sprocket 66 is coupled by the stretching sprocket 17 and the timing belt 67.

As shown in FIG. 10B and FIGS. 11 to 13, the guiding device (roller supporting means) 71 for supporting the slat roller 29 along the long direction from the lower position of the driving sprocket 25 at the inner surface of the lower frame bar 3 is provided. The guiding device 71 is constituted by a guide bracket 72, a guide plate 73, a side guide 74, a first guide rail member 76, a second guide rail member 78 and the like.

The guide bracket 72 is provided on the upstream side of the conveying direction from a lower position of the driving sprocket 25, and formed by a plate material having a reverse L-shaped cross section.

The guide plate 73 is provided adjacent to the inside of the guide sprocket 72, and is formed by a plate material of L-shaped cross section consisting of a curved part 73A and a flat part 73B for supporting the right and left slat rollers 29 moving downward below the driving sprocket 25.

The side guide 74 is arranged above the curved part 73A of the guide plate 73 and adjacent to the inside of the standing part 11, and is formed from a flat plate material in which one end side has a width from the lowest end of the guide bracket 72 to the upmost end of the second guide rail member 78, and the other end has a width from the lowest end to the upmost end of the second guide rail member 78.

The first guide rail member 76, using the through-hole 56A formed at a plurality of locations, is attached to the upper part of the curved part 73A of the guide plate 73 by the bolt nut 55, and is made of urethane rubber.

The second guide rail member 78, using the through-hole 78A, is attached to the upper part of the flat part 73B of the guide plate 73 in continuation to the first guide rail member 76 by the bolt nut 57, and is made of ultrahigh molecular weight polyethylene.

A projecting part 78B formed higher than the return side guide 15 is provided at the location positioned below the tension adjusting means 61 in the second guide rail member 78 that is, at the location positioned below the bearing part 63 of the tension adjusting means 61.

The conveying operation of the above embodiment will now be described.

When performing the conveyance of the article 7 by the above mentioned slat type conveyor (shoe slide type sorting device), the electrical motor 23 is driven thus rotatably driving the driving shaft 22, the right and left chains 27 are rotated by means of the driven sprocket 24 and the driving sprocket 25, which in turn circulates and moves the slat 27 group while being supported and guided by the advance side guide 14 and the return side guide 15, and the article 7 provided on the slat 27 of the starting end is thereby conveyed in the conveying direction X. The shoe 28 integrally moving with the slat 27 traverses and diagonally moves with respect to the conveying direction X to perform the allocating task of the article 7.

During the drive of the slat type conveyor performing such conveyance, the driving sprocket 25 provided on the driving shaft 22 and the stretching sprocket 17 are both rotated, and the adjusting external sprocket 66 is rotated by means of the timing belt 67 by the rotation of the stretching sprocket 17, thus rotating the adjusting interior sprocket 65. That is, since the rotational driving force of the driving shaft 22 is transferred to the adjusting driven shaft 64 by means of the timing belt 67, the driving sprocket 25 provided on the driving shaft 22 and the adjusting interior sprocket 65 provided on the adjusting driven shaft 64 are cooperatively moved.

The driving sprocket 25 and the adjusting interior sprocket 65 are thereby synchronized and rotated, and the chain 27 fitted to the adjusting interior sprocket 65, that is the return side chain 27 moving in the direction opposite the conveying direction X is pulled in the direction opposite the conveying direction X by the adjusting interior sprocket 65.

The right and left slat rollers 29 moving downward below the driving sprocket 25 are landed on the first guide rail member 76 arranged on the upper part of the curved part 73A of the guide plate 73, and after being moved in the direction opposite the conveying direction X on the return side guide part 76 of the first guide rail member 76, are moved in the direction opposite the conveying direction X on the return side guide part 78C of the second guide rail member 78, and moved in the direction opposite the conveying direction X on the return side guide 15 formed on the lower frame bar 3.

Thus, when the slat roller 29 having the outer periphery thereof made of urethane rubber lands on the first guide rail member 76, since it is received at the first guide rail member 76 made of urethane rubber, the impact of the slat roller 29 can be alleviated and the contacting noise can be greatly reduced.

The projecting part 78B formed at a position higher than the upper surface of the return side guide 15 is provided at the location positioned below the tension adjusting means 61 in the second guide rail member 78, that is the location positioned below the bearing part 63, and the chain 27 on the return side is securely fitted to the tip 65A of the adjusting interior sprocket 65.

The chain 27 on the return side is thereby securely pulled in the direction opposite the conveying direction X by the adjusting interior sprocket 65, and thus the hanging of the chain 27 on the return side can be suppressed.

According to the second embodiment, by rotating the adjusting interior sprocket 65 along with the adjusting exterior sprocket 66 by means of the timing belt 67 with the rotation of the stretching sprocket 17, that is by cooperatively moving (synchronizing) the driving sprocket 25 provided on the driving shaft 22 and the adjusting interior sprocket 65 provided on the adjusting driven shaft 64, and pulling the chain 27 on the return side in the direction opposite the conveying direction X, the hanging of the chain 27 on the return side is suppressed, and thus the contacting noise of the chain 27 can be reduced.

According to the second embodiment, by arranging the guiding device 71 (guide plate 73 and the like) below the chain 27 on the return side along the direction opposite the conveying direction X from the lower position of the driving sprocket 25, the right and left slat rollers 29 moving downward below the driving sprocket 25 can be supported, and thus the hanging of the chain 27 on the return side is suppressed and the contacting noise of the chain 27 is reduced.

According to the second embodiment, by providing the bearing part 63 supporting the adjusting driven shaft 64 on the upper surface of the lower frame bar 3, the adjusting interior sprocket 65 is arranged between the advance side chain 26 and the return side chain 26 coming around the driving sprocket 25, and the attachment space of the adjusting interior sprocket 65 is thus easily obtained.

In the second embodiment, the stretching sprocket 17 is provided outside the driving sprocket 25, but may also be attached to the inside of the driving sprocket 25. Here, the adjusting exterior sprocket 66 is also attached to the inside of the adjusting interior sprocket 65.

In the second embodiment, the stretching sprocket 17 and the adjusting exterior sprocket 66 are coupled with the timing belt 67, but is not limited thereto and a coupling method other than the belt may also be used.

In the second embodiment, the first guide rail member 76 is made of urethane rubber but is not limited thereto, and may be made of a material that alleviates the impact of the slat roller 29, or any material that alleviates the impact of the slat roller 29 and absorbs the contacting noise of the slat roller 29. Further, the second guide rail member 78 is made of ultrahigh molecular weight polyethylene but is not limited thereto, and may be a material that alleviates the impact of the slat roller 29 and has wear resistance, or any material that alleviates the impact of the slat roller 29, has wear resistance, and has satisfactory sliding property (low friction coefficient).

In the second embodiment, the tension adjusting means 61 is provided on the left end in the conveying direction X, but the tension adjusting means 61 may be provided on the right end or on both ends in the conveying direction X.

In the above first embodiment and the second embodiment, a slat type conveyor (shoe slide type sorting device) is used as the conveyor system, but other types of chain conveyor may also be used.

In the first and second embodiments, the branch paths 91A and 91B are formed externally on both sides of the conveying direction X, but a single or a plurality of branch path may be formed on only one side.

In the first and second embodiments, the slat roller 29 has the outer periphery thereof covered with a band body made of urethane rubber, but the entire slat roller 29 may be made of urethane rubber.

What is claimed is:

1. A conveyor system comprising:
   a body frame constituting a frame of the conveyor system and arranged in a conveying direction of an article;
   a driven shaft rotatably arranged at an upstream end of the conveying direction of the body frame and provided with a driven sprocket on both ends in a right and left horizontal direction perpendicular to the conveying direction; and
   a rotatably driven driving shaft arranged rotatably at a downstream end of the conveying direction of the body frame and provided with a driving sprocket arranged on both ends in the right and left horizontal direction, wherein chains are arranged between the left driven sprocket and the left driving sprocket and between the right driven sprocket and the right driving sprocket, respectively, and an article is supported on a plurality of slats arranged across the right and left chains and conveyed by the rotational drive of the driving sprocket, wherein the conveyor system further comprising:

a pair of right and left slat rollers coupled to the chain at each right and left ends of each slat, for supporting the slat;

a pair of right and left advance side guides arranged along the conveying direction at an inner surface of the body frame, for supporting and traveling each of the right and left slat rollers in the conveying direction;

a pair of right and left return side guides arranged below the advance side guides at the inner surface of the body frame, for supporting and traveling each of the right and left slat rollers in a direction opposite the conveying direction; and a suppressing device fixed at one end and freely movable upward and downward at the other end below the driving sprocket and suppressing hanging of the chain moving in the direction opposite the conveying direction.

2. The conveyor system according to claim 1, wherein the suppressing device comprises:

a pair of right and left supporting plates for supporting the right and left slat rollers moving downward below the driving sprockets, respectively;

a pair of right and left guiding rollers each arranged at a diagonally lower position at the downstream end of the conveying direction of the driving sprocket, and sandwiching each supporting plate with the right and left slat rollers moving downward from the driving sprocket; and a position adjusting member for suppressing rotation of the guiding roller involved in the diagonally downward movement of the supporting plate by the slat roller, and adjusting the downward movement of the supporting plate.

3. The conveyor system according to claim 2, wherein the supporting plate is made of urethane rubber.

4. The conveyor system according to claim 2, further comprising a coupling member for coupling the pair of right and left supporting plates.

5. The conveyor system according to claim 2, wherein each of the pair of supporting plates comprises a horizontally flat part arranged to extend along the conveying direction from the lower position of the driving sprocket and a curved part curved upwards along an outer shape of the driving sprocket from one end of the flat part, wherein the other end of the flat part is fixed to the return side guide and freely moves upwards/downwards with the fixed point as a supporting point.

6. The conveyor system according to claim 5, wherein the position adjusting member comprises:

a pair of right and left belt bodies each having one end fixed to the fixed point and arranged to extend from the fixed point to the lower position of the guiding roller along the lower surface of the supporting plate and the upper surface of the guiding roller, for supporting the supporting plate from below; and at least one adjusting member coupled to the other end of the belt body.

7. A conveyor system comprising:

a body frame constituting a frame of the conveyor system and arranged in a conveying direction of an article;

a driven shaft rotatably arranged at an upstream end of the conveying direction of the body frame and provided with a driven sprocket on both ends in a right and left horizontal direction perpendicular to the conveying direction; and a rotatably driven driving shaft arranged rotatably at a downstream end of the conveying direction of the body frame and provided with a driving sprocket arranged on both ends in the right and left horizontal direction, wherein chains are arranged between the left driven sprocket and the left driving sprocket and between the right driven sprocket and the right driving sprocket, respectively, and an article is supported on a plurality of slats arranged across the right and left chains and conveyed by the rotational drive of the driving sprocket, wherein the conveyor system further comprising:

a pair of right and left slat rollers coupled to the chain at each right and left ends of each slat, for supporting the slat;

a pair of right and left advance side guides arranged along the conveying direction at an inner surface of the body frame, for supporting and traveling each of the right and left slat rollers in the conveying direction;

a pair of right and left return side guides arranged below the advance side guides at the inner surface of the body frame, for supporting and traveling each of the right and left slat rollers in a direction opposite the conveying direction; and a suppressing device moving downward below the driving sprocket and suppressing hanging of the chain moving in the direction opposite the conveying direction, wherein the suppressing device comprises:

a stretching sprocket driven to rotate with the driving sprocket;

an adjusting sprocket arranged in the conveying direction at an upstream side of the driving sprocket, for rotating the chain moving in the direction opposite the conveying direction; and an operating member coupled to the stretching sprocket, and operating the adjusting sprocket in synchronization with the stretching sprocket.

8. The conveyor system according to claim 7, wherein the body frame comprises upper frame bars and lower frame bars arranged in a vertical positional relation on the right and left sides, and the adjusting sprocket is supported by the lower frame bar.

* * * * *